April 2, 1935.  H. K. JETT ET AL  1,996,424

SEAT BACK OPERATING MECHANISM

Filed May 22, 1934

Inventors
Hamer K. Jett &
Howard L. Showalter

By Miller + Miller
Attorneys

Patented Apr. 2, 1935

1,996,424

UNITED STATES PATENT OFFICE 1,996,424

SEAT BACK OPERATING MECHANISM

Hamer K. Jett and Howard L. Showalter, Brooksville, Ky.

Application May 22, 1934, Serial No. 726,975

13 Claims. (Cl. 296—66)

The present invention relates to operating mechanism for seat backs or the like and more particularly to means for readily opening the lid or back support of the rumble seat of a vehicle such as an automobile, airplane, boat or the like.

Heretofore, the opening of the back of a rumble seat or the like has been attended with a number of undesirable operations. The person about to enter the seat is usually compelled to reach for a handle or the like normally located centrally of the seat back. Aside from the fact that he must place himself in an awkward and inefficient position, it is not infrequent to find that the clothes of the individual are brought in contact with the side of the vehicle and accordingly stained or spotted. With the instant device these defects are remedied in a most efficacious manner.

One of the primary objects is the provision of a device of the character indicated whereby the weight of the individual entering the seat will serve to throw the seat back to a position to allow the user to take his place on the seat.

Another aim is to construct a mechanism along the lines outlined embodying a link arrangement that will operate to throw the seat back when the user places his weight on the step leading to the rumble seat.

Still a further object is to construct the device of relatively few parts and which is capable of manufacturing at a small cost.

Still a further object of this invention is to provide an automatic rumble seat opener which does not materially alter the shape of the rumble seat and which may be installed in existing rumble seats of cars all ready in the hands of private owners.

Figure 1:
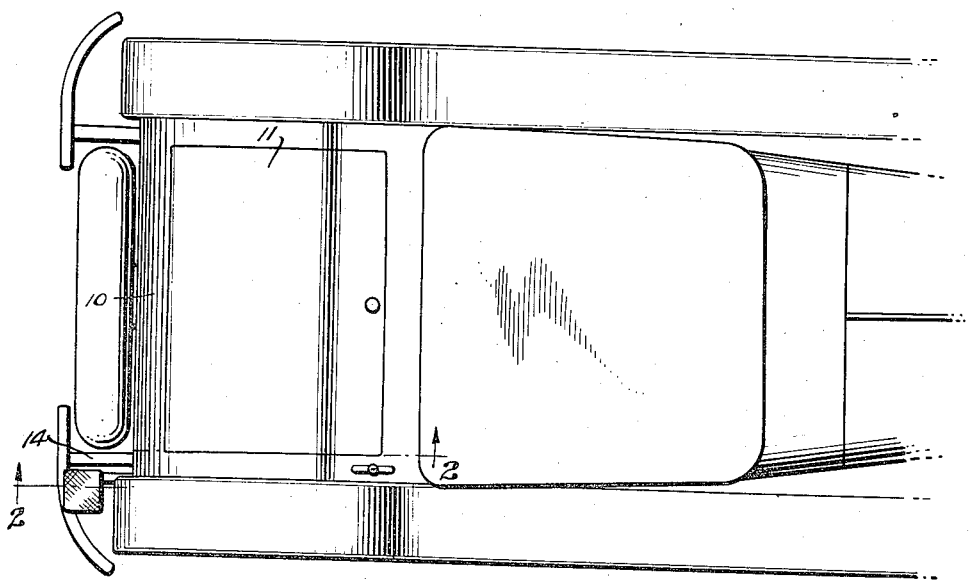
Figure 2:
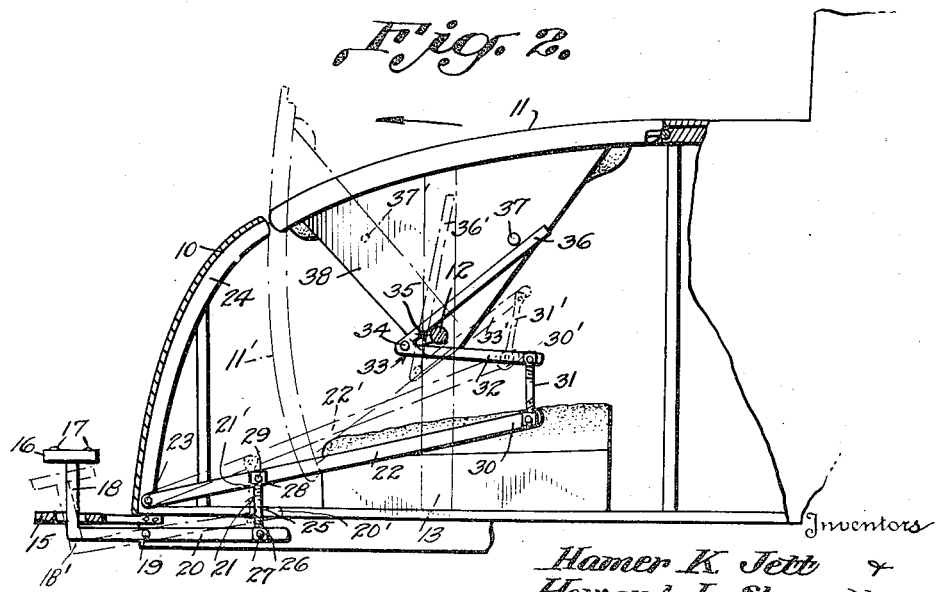

With the foregoing and other objects in view, as will hereinafter become apparent, this invention comprises the constructions, combinations and arrangements of parts, hereinafter set forth, disclosed and shown on the accompanying drawing. In this drawing, Figure 1 is a plan view of the invention as applied on an automobile, and Figure 2 is a sectional view taken approximately on the lines 2—2 of Figure 1.

There is shown at 10 an automobile of the type which carries a rumble seat, which rumble seat is covered over by the rumble seat back 11 in closed position when not in use, which rumble seat back 11 is hinged at 12 to the framework 13 of the automobile. At 14 is shown the bumper bar to which is fixed an arm 15. This arm 15, in the conventional rumble seat auto, formerly carried the step plate, but with this invention the step plate is omitted from the arm 15 and instead the step plate 16 is secured as by bolts or rivets 17 to a step arm 18 which is pivoted as at 19 to the chassis. The arm 15 acts as a stop member for the step plate 16 and limits the pivoting movement of the step arm 18.

The other end 20 of the step arm 18 is connected by a link 21 to a bar 22 which bar 22 is itself pivoted at 23 to a rib 24 of the framework of the automobile 10. To permit proper adjustment of the step arm 18 relative to the bar 22, the link 21 may be made in the form of a turn buckle consisting of a reversely threaded bolt member 25 having a right hand thread at one end thereof and a left hand thread at the other end thereof. Cooperating with this reversely threaded bolt 25 is a nut 26 pivotally connected as at 27 to the end 20 of the step arm 18, and another nut 28 pivotally connected as at 29 to the bar 22. By rotating the bolt 25 the length of the link 21 may be properly adjusted.

The free end 30 of the bar 22 is connected by an adjustable link 31 to an arm 32 of the bell crank 33. The adjustable link 31 may be identically constructed with the adjustable link 21 just described in detail. The bell crank 33 is pivoted on a spindle 34 supported in a brace 35 pivoted to the framework 13 of the automobile 10. The free arm 36 of the bell crank 33 is adapted to abut against a pin 37 fixed in a convenient position on the rumble seat back 11 above its pivot point 12. As shown, this pin 37 may be fixed in the pivot plate 38 of the rumble seat back 11.

In operation, after the rumble seat back 11 has been unlocked or unlatched, it is only necessary for the person desiring to occupy the rumble seat to place his foot on the step plate 16. His weight will cause the step arm 18 to pivot to the position 18' and the step plate 16 will abut against the stop 15 at the position 16'. This will raise the other end 20 to the position 20' thereby moving the link 21 to the position 21' and the bar 22 to the position 22'. The free end of the bar now at 30' has raised the link 31 to the position 31' thereby pivoting the bell crank 33 to the new position 33' causing the free arm 36 to move to the position 36'.

As the free arm 36 moves to this new position 36', it abuts against the pin 37, lifting the same, and thereby lifting the rumble seat back 11 until the rumble seat back 11 is past said center and falls back into the position 11' with the pin in the position 37'.

As will be observed, there is no positive connection between the pin 37 and the free arm 36 of bell crank 33. In raising the seat the free arm 36 of bell crank 33 merely pushes against the pin 37 to the path of said center position allowing the weight of the rumble seat back 11 to continue the operation. After the weight of the user is removed from the step plate 16 the operating mechanism returns to its normal position and does not in any way interfere with the closing of the rumble seat back 11, and is closed in the usual way after the rumble seat occupants have removed themselves by merely pushing the rumble seat back 11 about its pivot 12 back to the normal closed position, ready to be opened again in the manner just described.

While the mechanism has been described as opening the rumble seat back of a rumble seat back, it may likewise be applied in an obvious manner to operating a cover for an aeroplane seat or a cover for the seat of a motor boat or the like.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. An opening mechanism for a seat back of a seat in a normally inaccessible position and normally requiring the use of a step to gain access thereto wherein the seat back is pivoted for movement from a closed position to an open position, comprising means for abutting against the seat back in closed position and moving it to an open position, and means involving normal use of said step for operating said abutting means.

2. An opening mechanism for a seat back of a seat in a normally inaccessible position and normally requiring the use of a step to gain access thereto wherein the seat back is pivoted for movement from a closed position to an open position, comprising means for abutting against the seat back in closed position and moving it to an open position, and means for operating said abutting means, said operating means including a pivoted step arm on which said step is mounted.

3. An opening mechanism for a seat back of a seat in a normally inaccessible position and normally requiring the use of a step to gain access thereto wherein the seat back is pivoted for movement from a closed position to an open position, comprising means for abutting against the seat back in closed position and moving it to an open position, means for operating said abutting means, said operating means including a pivoted step arm, said step including a step plate on said step arm, and stop means limiting the movement of said step plate.

4. An opening mechanism for a seat back of a seat in a normally inaccessible position and normally requiring the use of a step to gain access thereto wherein the seat back is pivoted for movement from a closed position to an open position, comprising means for abutting against the seat back in closed position and moving it to an open position, means for operating said abutting means, said operating means including a pivoted step arm on which said step is mounted, and a lever linked to said pivoted step arm and to said abutting means.

5. An opening mechanism for a rumble seat back mounted in a vehicle framework wherein the seat back is pivoted for movement from a closed position to an open position, comprising means for abutting against the seat back in closed position and moving it to an open position, means for operating said abutting means, said operating means including a pivoted step arm, a bar pivoted at one end to the vehicle framework, an adjustable link pivotally connecting an end of said step arm to said bar, and a second adjustable link pivotally connecting the free end of said bar to said abutting means.

6. An opening mechanism for a rumble seat back mounted in a vehicle framework wherein the seat back is pivoted for movement from a closed position to an open position, comprising means for abutting against the seat back in closed position and moving it to an open position, means for operating said abutting means, said operating means including a pivoted step arm, said abutting means comprising a bell crank pivoted to the framework of the vehicle, one end of said bell crank being secured to the operating mechanism, and the other end of said bell crank abutting against said seat back.

7. An opening mechanism for a rumble seat back mounted in a vehicle framework wherein the seat back is pivoted for movement from a closed position to an open position, comprising means for abutting against the seat back in closed position and moving it to an open position, means for operating said abutting means, said operating means including a pivoted step arm, a bar pivoted at one end to the automobile framework, an adjustable link pivotally connecting an end of said step arm to said bar, and a second adjustable link pivotally connecting the free end of said bar to said abutting means, said abutting means comprising a bell crank pivoted to the framework of the vehicle, one end of said bell crank being pivotally secured to said second adjustable link, an abutting pin fixed to said seat back, the free end of said bell crank moving against said abutting pin in operation.

8. In combination with a vehicle, a seat in said vehicle normally inaccessible from outside of said vehicle, a closure means normally barring access to said seat, a step normally used in gaining access to said seat, and means automatically operated by the normal use of said step opening said closure means to allow access to said seat.

9. In combination with a vehicle, a seat in said vehicle normally inaccessible from outside of said vehicle, a closure means normally barring access to said seat, a step normally used in gaining access to said seat, and means automatically operated by the normal use of said step opening said closure means to allow access to said seat, said seat comprising a rumble seat, said closure means comprising a rumble seat back, and said step comprising a rumble seat step.

10. In combination with a vehicle, a seat in said vehicle normally inaccessible from outside of said vehicle, a closure means normally barring access to said seat, a step normally used in gaining access to said seat, means automatically operated by the normal use of said step opening said closure means to allow access to said seat, said seat comprising a rumble seat back, and said step comprising a rumble seat step, said opening means serving to move said rumble seat back in the opening direction only.

11. An opening mechanism for a seat back of a seat in a normally inaccessible position and normally requiring the use of a step to gain access thereto wherein the seat back is pivoted for movement from a closed position to an open position and when in closed position bars access to the seat, said mechanism being automatically operated by the normal use of said step to operate the seat back from the closed to the open position.

12. An opening mechanism for a seat back of a seat in a normally inaccessible position and normally requiring the use of a step to gain access thereto wherein the seat back is pivoted for movement from a closed position to an open position and when in closed position bars access to the seat, said mechanism being automatically operated by the normal use of said step to operate the seat back from the closed to the open position, said mechanism including a movable step arm on which said step is mounted, and stop means limiting the movement of said step plate and supporting said step plate at the limit of its movement.

13. An opening mechanism for a seat back of a seat in a normally inaccessible position and normally requiring the use of a step to gain access thereto wherein the seat back is pivoted for movement from a closed position to an open position and when in closed position bars access to the seat, said mechanism being automatically operated by the normal use of said step to operate the seat back from the closed to the open position, said mechanism including a movable step arm on which said step is mounted, and stop means limiting the movement of said step plate and supporting said step plate the limit of its movement, said mechanism being inoperative when said seat back is already in open position.

HAMER K. JETT.
HOWARD L. SHOWALTER.